May 24, 1966     G. E. CLAUSSEN     3,253,120

WELDING ELECTRODES

Filed Aug. 19, 1963

INVENTOR.
GERARD E. CLAUSSEN
BY
ATTORNEYS

United States Patent Office 3,253,120
Patented May 24, 1966

3,253,120
WELDING ELECTRODES
Gerard E. Claussen, Troy, Ohio, assignor to Hobart Brothers Company, Troy, Ohio, a corporation of Ohio
Filed Aug. 19, 1963, Ser. No. 303,004
10 Claims. (Cl. 219—137)

This invention relates to the art of electric welding and specifically to welding electrodes to be used in welding chromium alloy steel having approximately 5% chromium.

One of the objects of the invention is the provision of electrodes which may be used with a gas shield of either pure carbon dioxide, a mixture of carbon dioxide, pure argon, pure helium, argon with a small percentage of oxygen, or helium with a small percentage of oxygen for welding chromium steel alloys of approximately the specified chromium content.

A further object of the invention is the provision of cored electrodes which when melted, form a weld having compositions substantially identical with the compositions of the chromium alloy steel being welded.

Other objects, advantages and features of the invention will be apparent from the following description, the accompanying drawing, and the appended claims.

Figure 1:
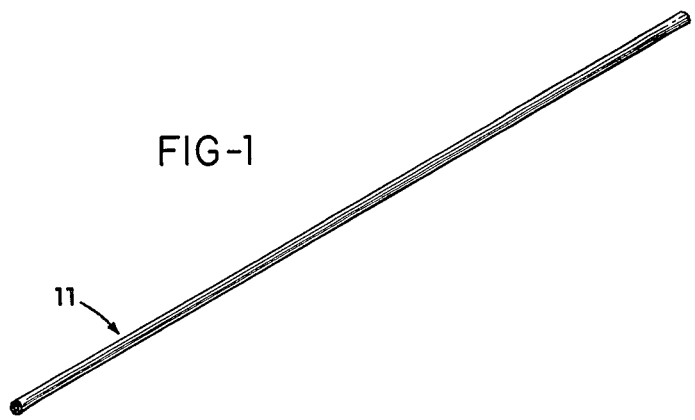
Figure 2:
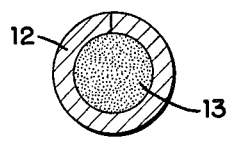

In the drawing—
FIG. 1 is a showing in perspective of an electrode formed according to the invention; and
FIG. 2 is a view in cross section of the electrode of FIG. 1, shown on a greatly enlarged scale.

The electrode disclosed herein is of value in welding an alloy steel having a relatively low carbon content and approximately 5% chromium content. Such a low carbon chromium alloy steel for example is a steel alloy having less than 0.12% carbon, approximately 5.0% chromium, approximately 0.5% manganese, up to 2.0% silicon, approximately 0.5% molybdenum and the remainder iron. One specific composition of such a 5% chromium alloy consists of the following elements:

| | Percent |
|---|---|
| C | 0.07 |
| Mn | 0.55 |
| Si | 0.93 |
| Mo | 0.47 |
| Cr | 5.45 |
| Fe | 92.53 |

Other specific compositions of such 5% chromium alloys, which can be welded by the cored electrode described herein are the commercial 5% chromium steels having specifications of the American Society for Testing Materials as follows:

| ASTM Spec. | C Max. | Mn | Si | Cr | Mo |
|---|---|---|---|---|---|
| A213T5 | 0.15 | .30–.60 | .50 max. | 4–6 | .45–.65 |
| A213T5b | 0.15 | .30–.60 | 1.0–2.0 | 4–6 | .45–.65 |
| A213T5c | 0.12 | .30–.60 | .50 max. | 4–6 | .45–.65 |
| A335P5 | 0.15 | .30–.60 | .50 max. | 4–6 | .45–.65 |
| A335P5b | 0.15 | .30–.60 | 1.0–2.0 | 4–6 | .45–.65 |
| A335P5c | 0.12 | .30–.60 | .50 max. | 4–6 | .45–.65 |
| A199 | 0.15 | .30–.60 | .50 max. | 4–6 | .45–.65 |
| A357 | 0.15 | .30–.60 | .50 max. | 4–6 | .45–.65 |

The ASTM specifications A213T5, A213T5b, and A213T5c are for seamless ferritic and austenitic alloy-steel boilers and superheater tubes. The ASTM specifications A335P5, A335P5b, and A335P5c are for seamless ferritic alloy-steel pipes for high temperature service. The ASTM specification A199 is for seamless cold drawn intermediate alloy-steel heat exchanger and condenser tubes. The ASTM specification A357 is for 5% chromium, 0.5% molybdenum steel plates for boilers and other pressure vessels.

The cored electrodes described herein are useful in welding other 5% chromium alloys wherein several of the above constituents are varied reasonably in order to secure various desired characteristics of the steel while the chromium content is held to approximately 5%.

The cored electrode 11 disclosed in the figures has a sheath 12 which encloses a core 13.

The sheath 12 disclosed in illustration of the invention is formed from a strip of mild steel having a width of 0.380 inch and a thickness of 0.030 inch. This is bent and formed to a hollow tube having an external diameter of $\frac{3}{32}$ inch (or .09375 inch). Other size strips may obviously be used in many different embodiments to form tubes having different diameters. For example .512 inch wide strips have been used to form tubes having diameters of 0.1875 inch. After forming relatively large size tubes, they may be drawn to smaller diameters. If desired, the thickness of the mild steel strip may be reduced and the amount of iron powder in the core (as set out in the example above) increased or in the alternative, the thickness of the strip may be increased and the amount of iron powder decreased. A preferred range of iron powder is from 0% to 50% by weight of the core, but satisfactory results have been obtained with iron powder present as high as 69% by weight of the core, as hereinafter indicated.

The composition of the mild steel strip disclosed in the illustration is from 0.03 to 0.10% carbon, .30 to .60% manganese, from 0.0% to 0.04% phosphorus, and from 0.0 to 0.05% sulfur, and approximately 0.01% silicon. Any of these elements can be varied reasonably but the above is an ideal analysis.

The sheath specified above was filled during the manufacturing and forming process with the core material, and when completely filled and closed, the cored electrode consisted of a round tube and the core. The complete electrode material (i.e. the tube and core) consisted of approximately 78.3% sheath and 21.7% core. In one illustrative embodiment, the following formula of the materials forming the core was used, all percentages being by weight:

| | Percent |
|---|---|
| Low carbon ferrochromium | 39.4 |
| Ferromolybdenum | 4.4 |
| Manganese | 1.5 |
| Ferrosilicon | 7.3 |
| Iron powder | 47.4 |

The ranges of composition of the core of electrodes provided for the welding of 5% chromium steels are:

| | Percent |
|---|---|
| Low carbon ferrochromium | 18.7 to 75.0 |
| Ferromolybdenum | 2.1 to 8.4 |
| Manganese | 0.8 to 2.9 |
| Ferrosilicon | 3.0 to 13.7 |
| Iron powder | 69.0 to 0.0 |

The range of composition of the deposited metal from the above compositions expressed in percentages by weight when deposited from an electrode having a low carbon sheath are:

| | Percent |
|---|---|
| Carbon | 0.0 to 0.12 |
| Chromium | 4.5 to 6.0 |
| Molybdenum | 0.40 to 2.25 |
| Manganese | 0.0 to 0.75 |
| Silicon | 0.0 to 0.90 |

The weld from the above described electrode was deposited at 480 amperes, 29 volts, direct current, reverse polarity on ¾ inch plate with 20 cubic feet per hour of carbon dioxide as shielding gas. The same materials have been used with submerged arc welding and using other shielding gases such as carbon dioxide, 75% argon and 25% $CO_2$, pure helium, pure argon, argon and oxygen, and helium and oxygen. The resulting weld metal was substantially identical with the steel being welded and met the specification for the type weld metal.

The weld metal was heated for two hours at 1550° F. and cooled slowly. The tensile properties then were:

| | |
|---|---|
| Yield strength | 49,000 p.s.i. |
| Tensile strength | 69,000 p.s.i. |
| Elongation | 30% in 2 inches. |
| Reduction in area | 65%. |

These properties are satisfactory.

In another illustrative embodiment, the electrode material consisted of approximately 84% sheath and 15% core. Therein the materials forming the core were provided according to the following formula:

| | Percent |
|---|---|
| Low carbon ferrochromium | 50 |
| Ferromolybdenum | 5.5 |
| Manganese | 1.9 |
| Ferrosilicon | 9.1 |
| Iron powder | 33.5 |

In another illustrative embodiment using a sheath consisting of approximately 78% and a core consisting of approximately 22%, the following formula, all percentages being by weight, was provided:

| | Percent |
|---|---|
| Low carbon ferrochromium | 40 |
| Ferromolybdenum | 6.6 |
| Manganese | 1.5 |
| Ferrosilicon | 7.3 |
| Iron powder | 44.6 |

The composition of the core of the electrode is varied for each type of arc shielding in order to offset undesirable loss of alloying elements to the flux or gas or any gain of Mn or Si from a flux.

For example, where the electrode is intended for use with $CO_2$ shielding, the core should contain about 1.5% manganese and about 2.5% silicon. A considerable part of the manganese and silicon is oxidized and lost during the $CO_2$ welding. The reasons for maintaining the Si and Mn at these relatively high levels in the core are (1) the high content of these metals improves the flow of the weld metal in narrow groove joints as for example in welding pipes and (2) the presence of silicon protects chromium from oxidation and loss. If, on the other hand, the electrode is intended for welding with an argon-oxygen or an argon-carbon dioxide mixture, the percentage of Mn and Si in the core may be reduced, because these gases are less oxidizing than carbon dioxide alone. If the electrode is to be used for submerged arc welding with a flux that contributes manganese and silicon to the weld metal, no manganese or silicon need be added to the core and the lower limit of the ranges of these metals in the core as set out above should be reduced to 0.0.

In making an electrode for alloys of the nature referred to herein (i.e. 5% chromium alloy steels), the core at times includes in addition to the alloying elements specified above, deoxidizing and fluxing ingredients where required.

While the specific forms of articles and specific compositions of matter herein described constitute preferred embodiments of the invention, it is to be understood that the invention is not limited to these precise forms and compositions and that changes may be made without departing from the scope of the invention which is defined in the appended claims.

What is claimed is:

1. A bare cored electrode for welding 5% chromium alloy steel, said steel consisting of less than 0.12% carbon, of approximately 5.0% Cr, of less than 0.6% manganese, of less than 2.0% silicon, of approximately 0.5% molybdenum and the remainder iron;
the electrode comprising a strip of mild steel folded substantially in the shape of a tube to form a sheath and a core contained within said sheath;
the sheath being formed from the strip of a low carbon steeel; and
the core consisting essentially of the following percentages by weight of:

| | Percent |
|---|---|
| Low carbon ferrochromium | 39.4 |
| Ferromolybdenum | 4.4 |
| Manganese | 1.5 |
| Ferrosilicon less than | 7.3 |
| Iron powder | 47.4 |

2. A bare cored electrode for welding 5% chromium alloy steel, said steel consisting of less than 0.12% carbon, of approximately 5.0% Cr, of less than 0.6% manganese, of less than 2.0% silicon, of approximately 0.5% molybdenum, and the remainder iron:
the electrode comprising a sheath formed from a strip of mild steel approximately 0.380 inch wide and 0.030 inch thick, folded substantially in the shape of a round tube and a core contained within said sheath;
the sheath being formed from the strip of a steel containing from 0.03 to 0.10% carbon, from 0.30 to 0.60% manganese, less than 0.04% phosphorus, less than 0.05% sulfur and about 0.01% silicon; and
the core consisting essentially of iron powder in an amount by weight of from 0–69% and of alloying and deoxidizing agents forming the remainder and consisting essentially of approximately the following percentages by weight of the core:

| | |
|---|---|
| Low carbon ferrochromium | 18.7–75.0%. |
| Ferromolybdenum | 2.1–8.4%. |
| Manganese | 0.8–2.9%. |
| Ferrosilicon | Less than 3.0–13.7%. |

3. A bare cored electrode for welding 5% chromium alloy steel, said steel consisting of less than 0.12% carbon, of approximately 5.0% Cr, of less than 0.6% manganese, of less than 2.0% silicon, of approximately 0.5% molybdenum, and the remainder iron;
the electrode comprising a sheath formed from a strip of mild steel approximately 0.380 inch wide and 0.030 inch thick, folded substantially in the shape of a round tube, having a diameter of approximately 0.09 inch and a core having a diameter of approximately 0.045 inch contained within said sheath;
the sheath being formed from a strip of a steel containing from 0.03 to 0.10% carbon, from 0.30 to 0.60% manganese, less than 0.04% phosphorus, less than 0.05% sulfur and about 0.01% silicon; and
the core consisting essentially of iron powder in an amount by weight of from 0–50% and of alloying and deoxidizing agents forming the remainder and consisting essentially of approximately the following percentages by weight of the core:

| | Percent |
|---|---|
| Low carbon ferrochromium | 39.4 |
| Ferromolybdenum | 4.4 |
| Manganese | 1.5 |
| Ferrosilicon | 7.3 |

4. A process of welding a 5% chromium alloy steel consisting of less than 0.12% carbon, approximately 5.0% Cr, less than 0.6% manganese, less than 2.0% silicon, approximately 0.5% molybdenum, and the remainder iron and being the work to be welded which comprises:
applying a bare cored electrode in close proximity to the portion of the work to be welded, said electrode having a sheath consisting of approximately 0.07% carbon, approximately 0.45% manganese, from 0.0% to 0.04% phosphorus, from 0.0 to 0.05% sulfur, approximately 0.01% silicon and the remainder iron, and the sheath enclosing a core consisting of from 18.7 to 75.0% low carbon ferrochromium, from 2.1 to 8.4% ferromolybdenum, from 0.8 to 2.9% manganese, from 3.0 to 13.7% ferrosilicon, and the remainder iron powder;

providing a gas shield around the point of application of the electrode to the work, the shield being formed of a gas selected from the group consisting of pure carbon dioxide, pure argon, pure helium, a mixture of argon and carbon dioxide, a mixture of helium and carbon dioxide, a mixture of argon and oxygen, and a mixture of helium and oxygen;

passing a welding arc producing electric current through said electrode and between said electrode and said work to melt the sheath and the enclosed core at the end of the electrode proximate to the work and to deposit the metal therefrom upon the work; and relatively moving said electrode with respect to the work to advance the weld on the work.

5. A process of welding a 5% chromium alloy steel being the work to be welded which comprises:

applying a bare cored electrode in close proximity to the portion of the work to be welded, said electrode having a sheath consisting mainly of iron, and the sheath enclosing a core comprising from 18.7 to 75.0% low carbon ferrochromium, from 2.1 to 8.4% ferromolybdenum, from 0.8 to 2.9% manganese, from 3.0 to 13.7% ferrosilicon, and the remainder iron powder;

providing a gas shield around the point of application of the electrode to the work, said shield being formed of a gas selected from the group consisting of pure carbon dioxide, pure argon, pure helium, a mixture of argon and carbon dioxide, a mixture of helium and carbon dioxide, a mixture of argon and oxygen, and a mixture of helium and oxygen;

passing a welding arc producing electric current through said electrode and between said electrode and said work to melt the sheath and the enclosed core at the end of the electrode proximate to the work and to deposit the metal therefrom upon the work; and relatively moving said electrode with respect to the work to advance the weld on the work.

6. A process of welding a 5% chromium alloy steel being the work to be welded which comprises:

applying a bare cored electrode in close proximity to the portion of the work to be welded, said electrode having a sheath consisting mainly of iron, and the sheath enclosing a core comprising from 18.7 to 75.0% low carbon ferrochromium, from 2.1 to 8.4% ferromolybdenum, from 0.8 to 2.9% manganese, from 3.0 to 13.7% ferrosilicon, and the remainder iron powder;

providing a gas shield around the point of application of the electrode to the work;

passing a welding arc producing electric current through said electrode and between said electrode and said work to melt the sheath and the enclosed core at the end of the electrode proximate to the work and to deposit the metal therefrom upon the work; and relatively moving said electrode with respect to the work to advance the weld on the work.

7. A bare cored electrode for welding 5% chromium alloy steel, comprising a sheath formed from a strip of mild steel formed substantially in the shape of a tube and a core contained within said sheath;

the sheath being formed from a strip of a steel containing less than .10% carbon; and the core consisting of particulate material as follows:

| | Percent |
|---|---|
| Low carbon ferrochromium | 18.7 to 75.0 |
| Ferromolybdenum | 2.1 to 8.4 |
| Manganese | 0.8 to 2.9 |
| Ferrosilicon | 3.0 to 13.7 |
| Iron powder | 69.0 to 0.0 |

8. A bare cored electrode as defined in claim 7 wherein the percentage of iron powder in the core is in the range of 0.50%.

9. Bare cored electrode for welding 5% chromium alloy steel, the electrode comprising a sheath formed from a strip of mild steel approximately 0.380 inch wide and 0.030 inch thick, folded substantially in the shape of a round tube having a diameter of approximately 0.09 inch and a core having a diameter of approximately 0.045 inch contained within said sheath; and the core containing iron powder in an amount by weight of from 0 to 69% of the core, and alloying and deoxidizing agents forming the remainder of the core and consisting essentially of the following percentages by weight of the core material:

| | Percent |
|---|---|
| Low carbon ferrochromium | 18.7 to 75.0 |
| Ferromolybdenum | 2.1 to 8.4 |
| Manganese | 0.8 to 2.9 |
| Ferrosilicon | 3.0 to 13.7 |

10. A process of welding a 5% chromium alloy steel as defined in claim 6, wherein the composition of the deposited metal consists essentially of the following materials present in percentage by weight within the following ranges:

| | Percent |
|---|---|
| Carbon | 0.0 to 0.12 |
| Chromium | 4.5 to 6.0 |
| Molybdenum | 0.40 to 2.25 |
| Manganese | 0.0 to 0.75 |
| Silicon | 0.0 to 0.90 |

References Cited by the Examiner

UNITED STATES PATENTS

| 2,291,482 | 7/1942 | McLott | 219—146 |
| 2,408,620 | 10/1946 | Friedlander | 219—146 |
| 2,990,301 | 6/1961 | Clemens | 117—207 |
| 3,101,405 | 8/1963 | Wilcox | 219—146 |
| 3,175,074 | 3/1965 | Culbertson | 219—146 |

RICHARD M. WOOD, *Primary Examiner.*

JOSEPH V. TRUHE, *Examiner.*